US012583169B2

(12) United States Patent
Komiyama et al.

(10) Patent No.: US 12,583,169 B2
(45) Date of Patent: Mar. 24, 2026

(54) METHOD AND APPARATUS FOR MANUFACTURING RESIN CONTAINER

(71) Applicant: NISSEI ASB MACHINE CO., LTD., Nagano (JP)

(72) Inventors: Tomokazu Komiyama, Nagano (JP); Atsushi Nagasaki, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 197 days.

(21) Appl. No.: 18/037,145

(22) PCT Filed: Nov. 17, 2021

(86) PCT No.: PCT/JP2021/042155
§ 371 (c)(1),
(2) Date: Aug. 16, 2023

(87) PCT Pub. No.: WO2022/107788
PCT Pub. Date: May 27, 2022

(65) Prior Publication Data
US 2024/0017472 A1     Jan. 18, 2024

(30) Foreign Application Priority Data

Nov. 18, 2020     (JP) ................................. 2020-191632

(51) Int. Cl.
*B29C 49/64* (2006.01)
*B29C 49/00* (2006.01)
(Continued)

(52) U.S. Cl.
CPC .......... *B29C 49/643* (2022.05); *B29C 49/062* (2013.01); *B29C 49/071* (2022.05); *B29C 2949/0771* (2022.05); *B29L 2031/716* (2013.01)

(58) Field of Classification Search
CPC ... B29C 49/643; B29C 49/062; B29C 49/071; B29C 49/786; B29C 49/6467;
(Continued)

(56) References Cited

U.S. PATENT DOCUMENTS 4,432,530 A * 2/1984 Marcinek ................ B29C 49/10
264/537
5,728,347 A 3/1998 Collette et al.
(Continued)

FOREIGN PATENT DOCUMENTS

JP        5-330535 A     12/1993
JP         9-1639 A      1/1997
(Continued)

OTHER PUBLICATIONS

International Search Report issued Jan. 18, 2022 in International Patent Application No. PCT/JP2021/042155, along with an English translation thereof.
(Continued)

*Primary Examiner* — Monica A Huson
(74) *Attorney, Agent, or Firm* — GREENBLUM & BERNSTEIN, P.L.C.

(57) ABSTRACT

A method for manufacturing a resin container includes: injection molding a preform made of a resin and having a body portion and a bottom portion; adjusting a temperature of the preform manufactured in the injection molding; and a blow molding step of blow-molding the preform having the adjusted temperature to manufacture a resin container. In the injection molding, the preform is injection-molded using an injection mold in which a thickness of the bottom portion is 0.7 to 0.85 relative to a thickness of the body portion. Further, in the adjusting the temperature, a coolant is introduced into the preform to cool the bottom portion of the preform.

5 Claims, 7 Drawing Sheets

(51) Int. Cl.
 B29C 49/06 (2006.01)
 B29L 31/00 (2006.01)

(58) Field of Classification Search
 CPC ...... B29C 2949/0781; B29C 2049/023; B29C
 2949/24; B29C 2949/0771; B29C
 2949/28; B29C 2049/7862; B29C
 49/6427; B29C 2949/22; B29C 2949/26;
 B29C 2949/3032; B29L 2031/716
 See application file for complete search history.

(56) References Cited

U.S. PATENT DOCUMENTS

| | | | |
|---|---|---|---|
| 11,135,759 B2 | 10/2021 | Muruyama | |
| 11,260,575 B2 | 3/2022 | Kawamura et al. | |
| 2016/0229087 A1* | 8/2016 | Gaiotti | B29C 49/02 |
| 2019/0337218 A1* | 11/2019 | Kawamura | B29C 45/7207 |
| 2022/0009145 A1 | 1/2022 | Tsuchiya | |

FOREIGN PATENT DOCUMENTS

| | | | |
|---|---|---|---|
| JP | 2002-1802 A | 1/2002 |
| JP | 2004-90425 A | 3/2004 |
| JP | 2016-182805 A | 10/2016 |
| WO | 94/01268 A1 | 1/1994 |
| WO | 2019/050021 A1 | 3/2019 |
| WO | 2019/078358 A1 | 4/2019 |
| WO | 2020/158917 A1 | 8/2020 |

OTHER PUBLICATIONS

Written Opinion issued Jan. 18, 2022 in International Patent Application No. PCT/JP2021/042155, along with an English translation thereof.

* cited by examiner

METHOD AND APPARATUS FOR MANUFACTURING RESIN CONTAINER

BACKGROUND OF THE INVENTION

Field of the Invention

The present invention relates to a method and an apparatus for manufacturing a resin container.

Description of the Related Art

Conventionally, a hot parison blow molding method has been known as one of methods for manufacturing a resin container. The hot parison blow molding method is a method of blow-molding a resin container using residual heat at the time of injection molding of a preform, and is advantageous in that more diverse resin containers with more excellent aesthetic appearances can be manufactured as compared with a cold parison method.

In the hot parison blow molding method, a body portion and the like of the preform are required to have an amount of heat by which the body portion and the like can be stretched, and the central region of a bottom portion of the preform is required to maintain hardness to such an extent that the central region is not broken by a stretching rod.

Conventionally, for example, there is a case where a preform in which a thickness of a bottom portion is set to about a half of a thickness of a body portion is used to increase an injection cooling efficiency of the bottom portion to meet the above-described requirements. JP 2004-90425 A discloses a thin cylindrical preform in which a bottom surface is formed as an inclined surface having the same angle of 20° to 45°, and a connection portion with a body portion is formed in an arc shape for a gradual transition of a thickness of the body portion from the bottom portion to suppress whitening of the bottom surface.

Further, recently, a method for manufacturing a container has been proposed in which a preform released at a high temperature is blow-molded at a high stretching ratio by shortening the cooling time in injection molding (see, for example, Japanese Patent No. 6505344). According to the above-described method for manufacturing a container, a resin container having good physical properties and appearance can be manufactured by a high-speed molding cycle.

In the hot parison blow molding method, there is a preform shape suitable for each container according to specifications such as physical properties and a stretching ratio of a container. For example, a flat bowl-shaped preform, for example, is applied in a case where a resin container having a wide mouth and a thin thickness, such as a cup, is manufactured. In this type of preform, a thickness of a body portion thickness is set to be relatively thin, and thus, a thickness of a bottom portion of the preform becomes even thinner when the thickness of the bottom portion is set to about a half of the thickness of the body portion.

In injection molding of the above-described preform, a space of the bottom portion of the preform in an injection mold becomes extremely narrow, and the flow resistance of a molten resin in the vicinity of a gate portion increases. Then, shear heat generation of the molten resin increases during the injection molding so that the temperature of the central region of the bottom portion of the preform increases. This makes it difficult to sufficiently cool the central region of the bottom portion of the preform, and crystallization (whitening) due to slow cooling is likely to occur in the central region of the bottom portion of the preform or the container.

In particular, it is more important to suppress the whitening in the central region of the bottom portion in a case where a preform released at a high temperature by shortening the cooling time during injection molding is blow-molded at a high stretching ratio.

SUMMARY OF THE INVENTION

A method for manufacturing a resin container according to an aspect of the present invention includes: injection molding a preform made of a resin and having a body portion and a bottom portion; adjusting a temperature of the preform manufactured in the injection molding blow-molding the preform having the adjusted temperature to manufacture a resin container. In the injection molding, the preform is injection-molded using an injection mold in which a thickness of the bottom portion is 0.7 to 0.85 relative to a thickness of the body portion. Further, in the adjusting the temperature, a coolant is introduced into the preform to cool the bottom portion of the preform.

Further features of the present invention will become apparent from the following description of exemplary embodiments with reference to the attached drawings.

DESCRIPTION OF THE EMBODIMENTS

Figure 1A:
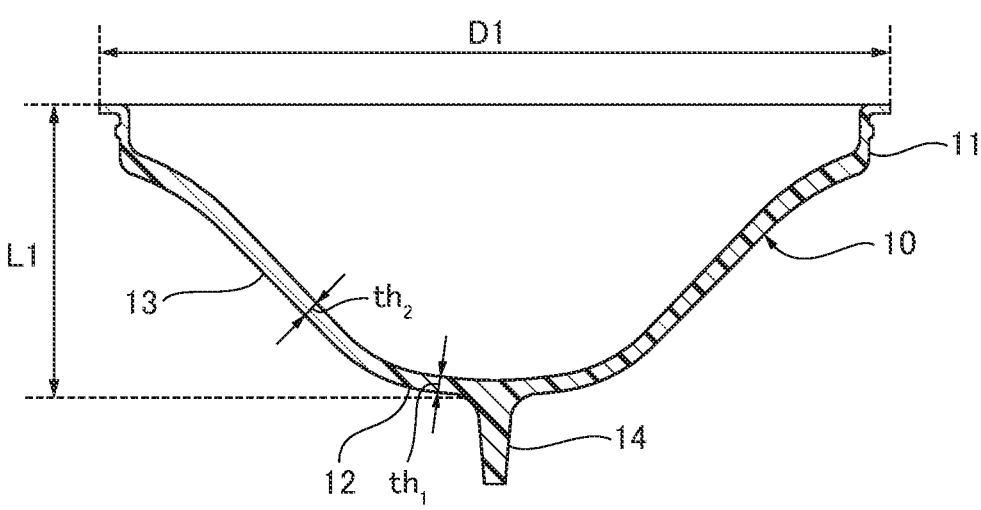
FIGS. 1A and 1B are views illustrating an example of a preform of the present embodiment.

Hereinafter, an embodiment of the present invention will be described with reference to the drawings.

In the embodiment, structures and elements other than the main part of the present invention will be described in a simplified or omitted manner in order for easy understanding. Further, the same elements are denoted by the same reference signs in the drawings. Note that shapes, dimensions, and the like of the respective elements illustrated in the drawings are schematically illustrated, and do not indicate actual shapes, dimensions, and the like.

<Description of Preform>

Figure 1B:
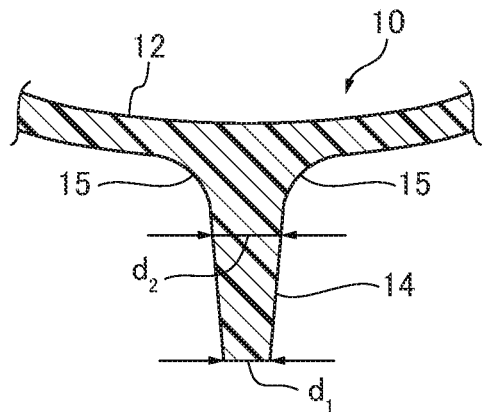

First, a configuration example of a preform 10 to be applied to manufacture of a resin container (hereinafter, also simply referred to as a container) of the present embodiment will be described with reference to FIGS. 1A and 1B. FIGS. 1A and 1B illustrates the entire shape of the preform 10, and FIG. 1B is a partially enlarged view of the vicinity of a gate portion 14 in FIG. 1A. Note that the preform 10 in FIGS. 1A and 1B is applied, for example, in a case where a container having a wide mouth and a thin thickness (see FIGS. 2A and 2B), such as a cup, is manufactured.

As illustrated in FIG. 1A, the entire shape of the preform 10 is a flat bottomed bowl shape protruding downward. A neck portion 11 having a tubular shape that is open upward is formed on an upper side of the preform 10, and a bottom portion 12 faces a lower side of the preform 10. Further, the neck portion 11 and the bottom portion 12 are connected by the body portion 13 over the entire region in the circumferential direction. Note that the above-described shape of the preform 10 is merely an example, and for example, the preform 10 may have a bottomed tubular shape or the like extending in the longitudinal direction.

Further, in the preform 10 of the present embodiment, a thickness $th_1$ of the bottom portion 12 is set to a value of 0.7 to 0.85 relative to a thickness $th_2$ of the body portion 13. That is, in the preform 10 of the present embodiment, the thickness of the bottom portion is relatively thick as compared with a preform of the related art in which a thickness of a bottom portion is set to about a half of a thickness of a body portion. In a hot parison blow molding method, the thickness of the bottom portion is set to about a half of the thickness of the body portion so as to prevent the bottom portion from being broken by a stretching rod in a blow molding step, and the bottom portion is sufficiently cooled and solidified in an injection molding step.

The gate portion 14 whose distal end protrudes toward an outer side of the bottom portion 12 is formed at the center of the bottom portion 12 of the preform 10. The gate portion 14 is a resin introduction mark from a hot runner mold 33, which will be described later, and is formed in a tapered shape in which a diameter increases from a distal end side of the gate portion 14 toward a proximal end side facing the bottom portion 12. Therefore, in the gate portion 14, a diameter dimension $d_2$ on the proximal end side is larger than a diameter dimension $d_1$ on the distal end side as illustrated in FIG. 1B. Note that a corner portion 15 where the gate portion 14 and an outer surface of the bottom portion are connected is rounded (formed in a round or an arc) on the proximal end side of the gate portion 14. The rounding is performed such that a radius thereof is set to be, for example, a numerical value of 2.0 mm to 4.0 mm (preferably 2.1 mm to 3.0 mm).

The thickness of the bottom portion 12 is set to be thinner than the diameter dimension $d_1$ of the gate portion, and is set to a value ranging from 0.70 to 0.9 (preferably from 0.75 to 0.85) when the diameter dimension $d_1$ is 1, for example. Further, in the preform 10, for example, a maximum diameter D1 (a diameter of the neck portion 11) is set to be longer than a length L1 (a length of the bottom portion 12 from an upper end of the neck portion 11 to an upper end of the gate portion 14). The diameter D1 is set to, for example, 1.5 to 3.0 times (preferably 1.5 to 2.5 times, more preferably 1.7 to 2.3 times) the length L1.

A material of the preform 10 is a thermoplastic synthetic resin, and can be appropriately selected according to the use of the container. Specific types of materials include, for example, polyethylene terephthalate (PET), polyethylene naphthalate (PEN), polycyclohexanedimethylene terephthalate (PCTA), and Tritan (registered trademark), which is a copolyester manufactured by Eastman Chemical Company), polypropylene (PP), polyethylene (PE), polycarbonate (PC), polyether sulfone (PES), polyphenyl sulfone (PPSU), polystyrene (PS), a cyclic olefin polymer (COP/COC), polymethyl methacrylate (PMMA), which is acrylic, polylactic acid (PLA), and the like. Note that the present invention is particularly effective in a case where a material (for example, PET or PEN) that is a thermoplastic synthetic resin and a crystalline resin and is likely to cause whitening due to spherulitic crystallization during injection molding is selected as the material of the preform 10.

<Description of Container>

Figures 2A, 2B:
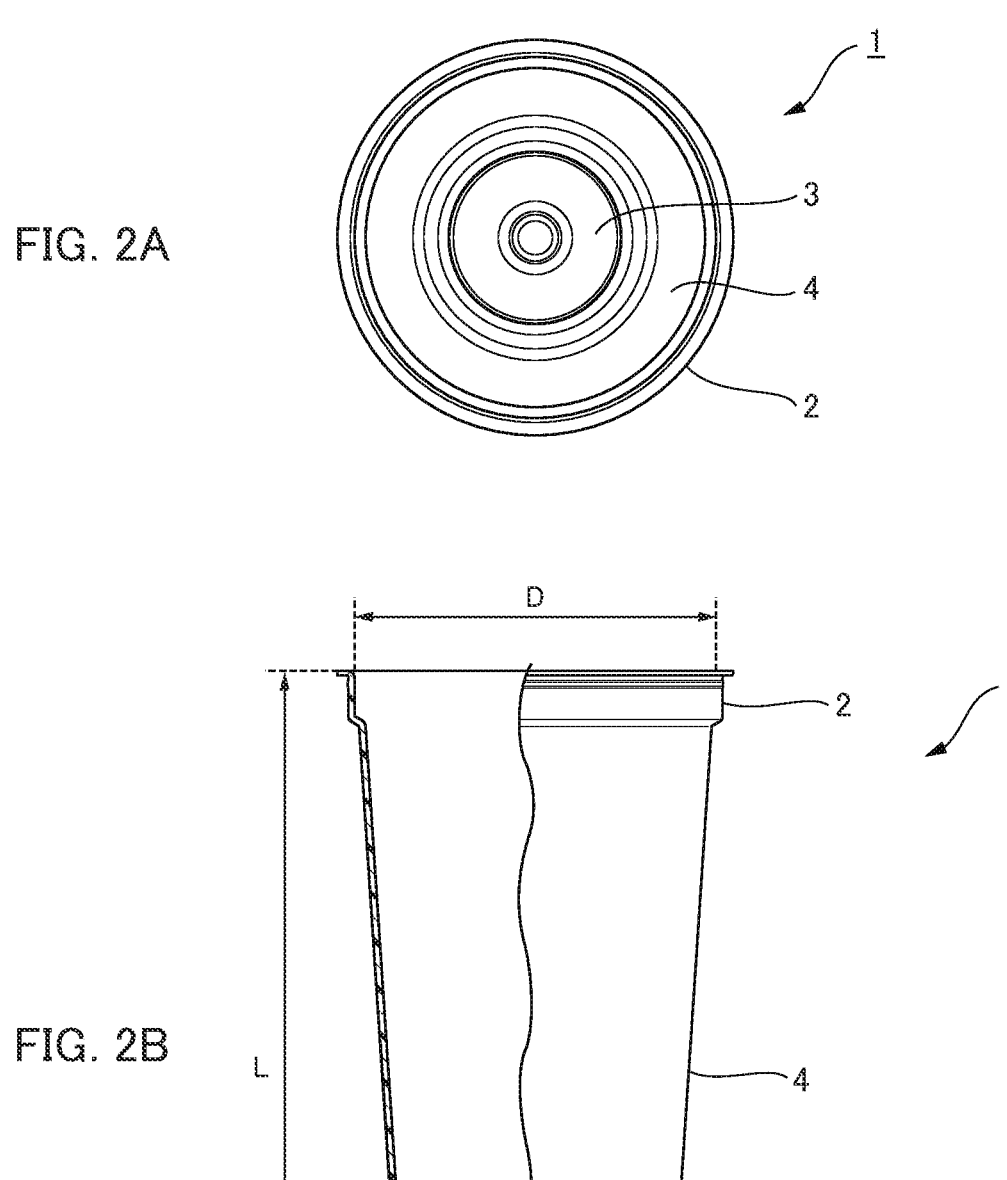
FIGS. 2A and 2B are views illustrating an example of a resin container of the present embodiment.

Next, a configuration example of the container of the present embodiment will be described with reference to FIGS. 2A and 2B. FIG. 2A is a plan view of the container, and FIG. 2B is a front view of the container. As illustrated in FIGS. 2A and 2B, a container 1 is a cup-shaped container with a wide mouth having an open upper surface and a closed bottom surface. The container 1 includes a neck portion 2 facing an opening portion on the upper surface side, a bottom portion 3 closing the bottom surface side, and a body portion 4 connecting the neck portion 2 and the bottom portion 3. The body portion 4 of the container 1 has a tapered shape (inverted truncated cone shape) in which a diameter decreases from the upper surface side to the bottom surface side. Further, the container 1 has a length (depth L) in the axial direction of the container being sufficiently longer than an inner diameter D of the container and is formed to have a large depth. A stretching ratio of the preform 10 in the vertical-axis direction with respect to the container 1 is set as high as 3.0 to 7.0 (preferably 3.5 to 6.0, more preferably 4.0 to 5.5).

<Description of Blow Molding Apparatus>

Figure 3:
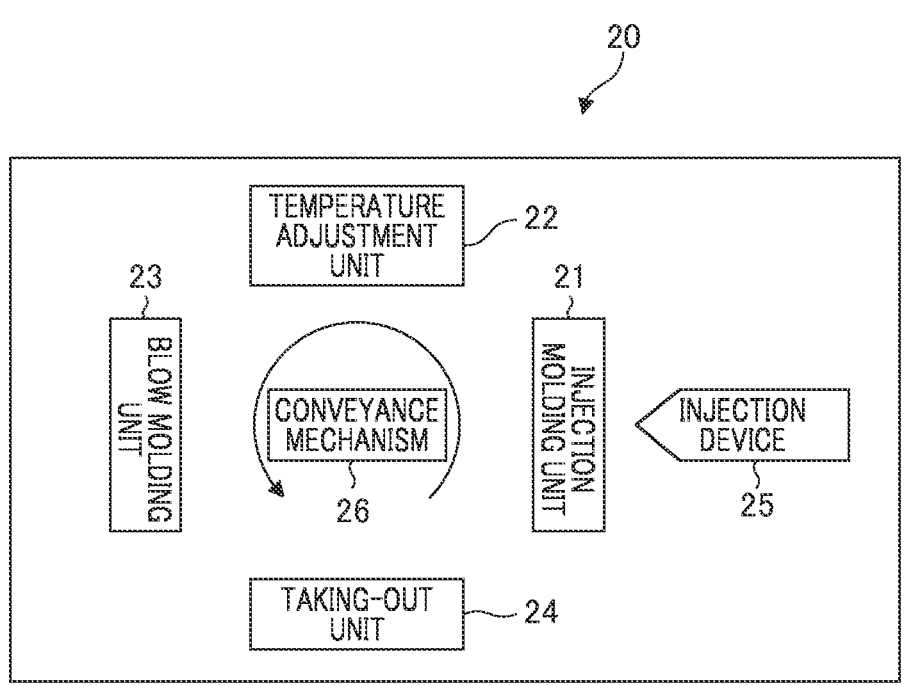
FIG. 3 is a diagram schematically illustrating a configuration of a blow molding apparatus of the present embodiment.

Next, a blow molding apparatus 20 for manufacturing a container will be described with reference to FIG. 3. FIG. 3 is a block diagram schematically illustrating a configuration of the blow molding apparatus 20. The blow molding apparatus 20 according to the present embodiment is an apparatus adopting a hot parison method (also referred to as a one stage method) that performs blow molding by utilizing residual heat (internal heat quantity) at the time of injection molding without cooling the preform 10 to room temperature.

The blow molding apparatus 20 includes an injection molding unit 21, a temperature adjustment unit 22, a blow molding unit 23, a taking-out unit 24, and a conveyance mechanism 26. The injection molding unit 21, the temperature adjustment unit 22, the blow molding unit 23, and the taking-out unit 24 are disposed at positions rotated each by a predetermined angle (for example, 90 degrees) around the conveyance mechanism 26.

(Conveyance Mechanism 26)

The conveyance mechanism 26 includes a transfer plate (not illustrated) that moves so as to rotate about an axis in a direction perpendicular to the paper surface of FIG. 3. In the transfer plate, one or more neck molds 27 (not illustrated in FIGS. 1A and 1B) for holding the neck portion of the preform 10 or a resin container (hereinafter, simply referred to as a container) are disposed at each predetermined angle. The conveyance mechanism 26 moves the transfer plate by 90 degrees to convey the preform 10 (or the container) whose neck portion is held by the neck mold 27 to the injection molding unit 21, the temperature adjustment unit 22, the blow molding unit 23, and the taking-out unit 24 in this order. Note that the conveyance mechanism 26 further includes a lifting and lowering mechanism (vertical mold opening/closing mechanism) and a mold opening mechanism of the neck mold 27, and also performs an operation of lifting and lowering the transfer plate and an operation related to mold closing and mold opening (releasing) in the injection molding unit 21 and the like.

(Injection Molding Unit 21)

Figure 4A:
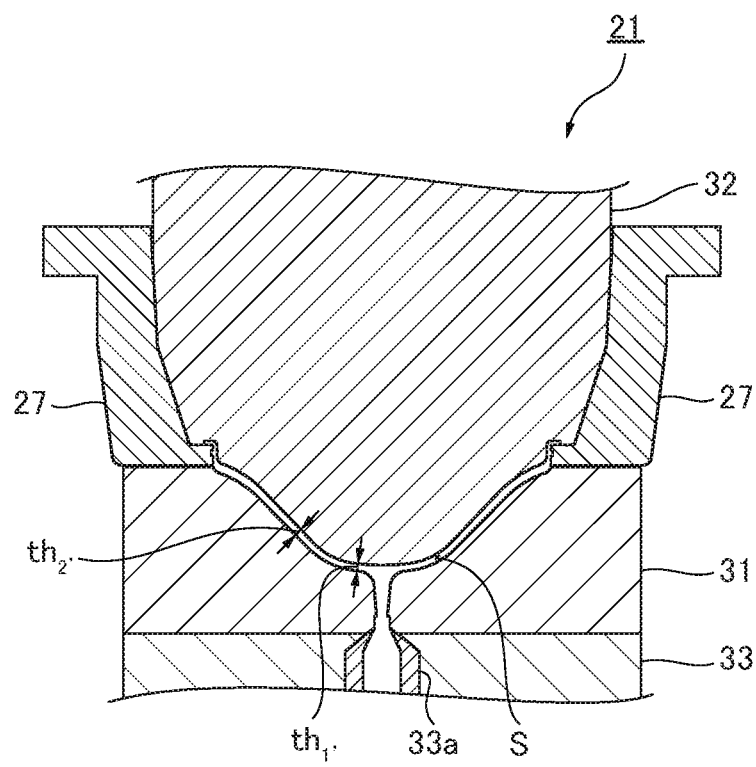
FIGS. 4A and 4B are views illustrating a configuration example of an injection molding unit.

As illustrated in FIG. 4A, the injection molding unit 21 includes an injection cavity mold 31, an injection core mold 32, and the hot runner mold 33, and manufactures the preform 10 by injection molding. The injection cavity mold 31 and the hot runner mold 33 are fixed to a machine base of the blow molding apparatus 20 in an integrated state. On the other hand, the injection core mold 32 is fixed to a core mold lifting and lowering mechanism (not illustrated). Further, an injection device 25 that supplies a resin material, which is a raw material of the preform, is connected to the injection molding unit 21.

The injection cavity mold 31 is a mold that defines a shape of an outer periphery of the preform 10. The hot runner mold 33 includes a resin supply portion 33a that introduces the resin material into the mold from the injection device 25. Further, the injection core mold 32 is a mold that defines a shape of an inner peripheral side of the preform 10, and is inserted into inner peripheral sides of the neck mold 27 and the injection cavity mold 31 from above.

A mold space S formed by the injection cavity mold 31 and the injection core mold 32 has a shape following the preform 10. In the mold space S, an interval $th_1$, of a mold space corresponding to the thickness of the bottom portion 12 is set to a value of 0.7 to 0.85 relative to an interval $th_2$, of a mold space corresponding to the thickness of the body portion 13.

Figure 4B:
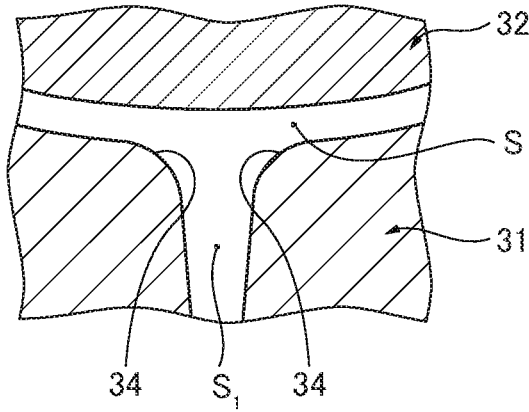

As illustrated in FIG. 4B, in the injection cavity mold 31, a gate region $S_1$ connected to the resin supply portion 33a is formed in a tapered shape in which a diameter increases toward the injection core mold 32. Further, at an exit of the gate region $S_1$ facing the injection core mold 32, a corner portion 34 where the gate region $S_1$ and the outer surface of the bottom portion are connected is rounded. Note that a radius of curvature of the corner portion 34 is, for example, 1 mm or more.

In the injection molding unit 21, the injection cavity mold 31, the injection core mold 32, and the neck mold 27 of the conveyance mechanism 26 are closed to form the mold space S having the preform shape. Then, the resin material is caused to flow from the injection device 25 into the mold space S having such a preform shape via the hot runner mold 33, whereby the preform 10 is manufactured by the injection molding unit 21.

On the other hand, the injection device 25 is a device in which a screw is provided to be rotatable and retractable in a cylinder of a barrel, and has a function of heating and melting the resin material and injecting the resin material into the molds. The injection device 25 performs injection, pressure holding, and metering in order by the action of the screw.

The injection device 25 supplies the resin material from a hopper to a cylinder in which the screw is disposed, and performs plasticization kneading and metering of the resin material by rotation and retraction of the screw. Then, the injection device 25 advances the screw at a high speed to inject and fill the molten resin into the molds. Next, the injection device 25 advances the screw at a low speed and at a predetermined pressure to additionally inject and fill the molten resin into the molds so as to compensate the amount of shrinkage of the molten resin in the molds, and the pressure holding is performed in this state. The injection device 25 controls a movement speed (injection speed) of the screw when the molds are being filled with the resin material at a high speed, and performs control with the pressure (holding pressure) after the molds are filled with the resin material at a high speed. Switching from the speed control to the pressure control is performed using a screw position or an injection pressure as a threshold.

Note that even when the molds of injection molding unit 21 are opened, the neck mold 27 of the conveyance mechanism 26 is not opened, and the preform 10 is held and conveyed as it is. The number of the preforms 10 simultaneously molded by the injection molding unit 21 (that is, the number of containers that can be simultaneously molded by the blow molding apparatus 20) can be appropriately set.

(Temperature Adjustment Unit 22)

The temperature adjustment unit 22 performs temperature equalization and temperature unevenness removal of the preform 10 manufactured by the injection molding unit 21, and adjusts the temperature of the preform 10 to a temperature suitable for blow molding (for example, about 90° C. to 105° C.) so as to have a temperature distribution suitable for a container shape to be shaped. Further, the temperature adjustment unit 22 also has a function of cooling the preform 10 in a high temperature state after injection molding.

Figure 5:
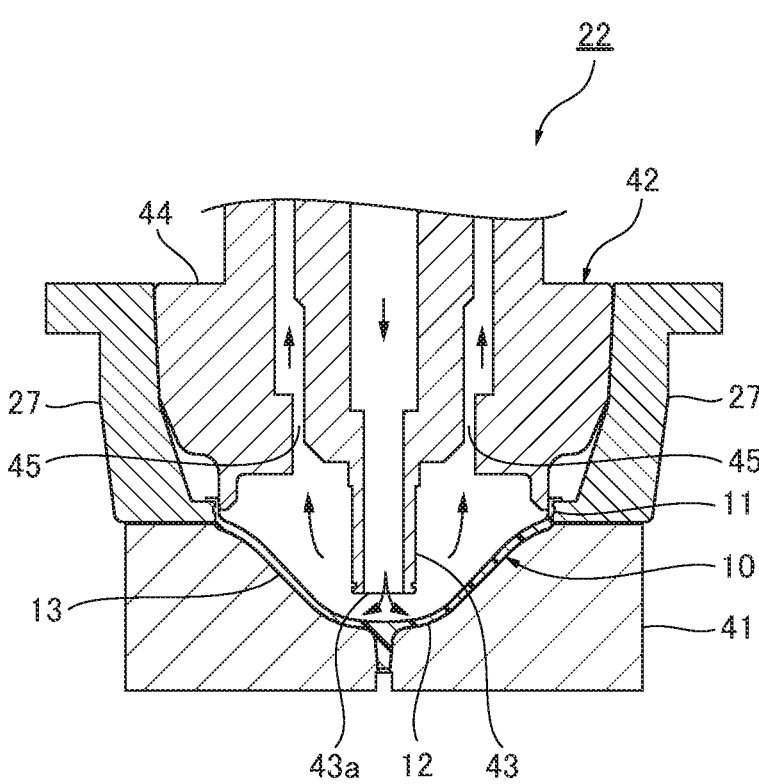
FIG. 5 is a view illustrating a configuration example of a temperature adjustment unit.

FIG. 5 is a view illustrating a configuration example of the temperature adjustment unit 22. The temperature adjustment unit 22 includes a cavity mold (temperature adjusting pot) 41 capable of accommodating a preform and an air introduction member 42 as a mold unit for temperature adjustment.

The cavity mold 41 is a mold having a temperature adjusting space having substantially the same shape as the preform 10 manufactured by the injection molding unit 21. A flow path (not illustrated) through which a temperature adjusting medium (coolant) flows is formed inside the cavity mold 41. Therefore, the temperature of the cavity mold 41 is maintained at a predetermined temperature by the temperature adjusting medium.

Note that the temperature of the temperature adjusting medium of the cavity mold 41 is not particularly limited, but can be appropriately selected within a range of, for example, 5° C. to 80° C., preferably 30° C. to 60° C.

The air introduction member 42 includes an air introduction rod 43 connected to an air supply unit (not illustrated) and a fitting core 44, and is inserted into the neck mold 27 and the preform 10. The air introduction member 42 airtightly abuts on the neck portion 11 of the preform 10 in a state of being inserted into the neck mold 27. The air introduction rod 43 and the fitting core 44 are both hollow tubular bodies, and the air introduction rod 43 is concentrically disposed on an inner side of the fitting core 44.

The inside of the air introduction rod 43 forms a flow path for introducing compressed air (air and a gaseous coolant) from the air supply unit, and a distal end of the air introduction rod 43 is inserted to the vicinity of the bottom surface of the preform 10. Further, an opening 43a configured to supply the compressed air into the preform 10 is formed at the distal end of the air introduction rod 43 facing the bottom portion of the preform 10.

The fitting core 44 is in close contact with an inner periphery or an upper end surface of the neck portion 11 when the air introduction rod 43 is inserted into the neck mold 27, and maintains the airtightness between the preform 10 and the air introduction member 42.

A distal end of the fitting core 44 is inserted into or abuts on a position of the neck portion 11 of the preform 10. Further, an opening 45 configured to exhaust air from the inside of the preform 10 is formed at the distal end of the fitting core 44. Further, a space between the air introduction rod 43 and the fitting core 44 constitutes an exhaust flow path connected to an air exhaust unit (not illustrated).

(Blow Molding Unit 23)

The blow molding unit 23 performs stretch blow molding on the preform 10 whose temperature has been adjusted by the temperature adjustment unit 22 to manufacture the container.

The blow molding unit 23 includes a blow cavity mold which is a pair of split molds corresponding to a shape of the container, a bottom mold, a stretching rod, and an air introduction member (all of which are not illustrated). The blow molding unit 23 blow-molds the preform 10 while stretching the preform 10. As a result, the preform 10 can be shaped into a shape of the blow cavity mold, whereby the container can be manufactured.

(Taking-Out Unit 24)

The taking-out unit 24 is configured to open the neck portion of the container manufactured by the blow molding unit 23 from the neck mold 27 and take out the container to the outside of the blow molding apparatus 20.

<Description of Blow Molding Method>

Next, a blow molding method by the blow molding apparatus 20 of the present embodiment will be described.

Figure 6:
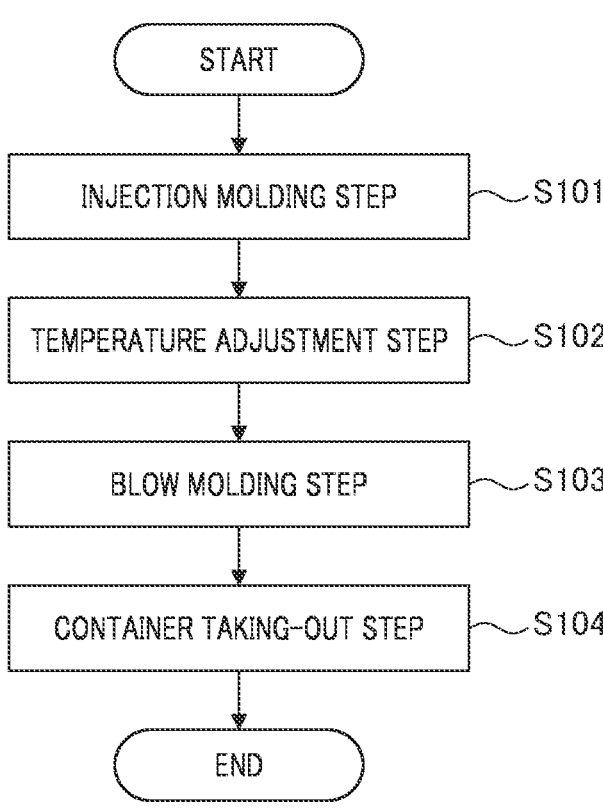
FIG. 6 is a flowchart illustrating steps of a method for manufacturing a container.

FIG. 6 is a flowchart illustrating steps of the blow molding method.

(Step S101: Injection Molding Step)

In Step S101, in the injection molding unit 21, a resin is injected from the injection device 25 into a mold space having a preform shape formed by the injection cavity mold 31, the injection core mold 32, and the neck mold 27 of the conveyance mechanism 26 to manufacture the preform 10.

The resin injected from the injection device 25 passes through the gate region $S_1$ of the injection cavity mold 31 from the resin supply portion 33*a* of the hot runner mold 33, and fills the mold space S between the injection cavity mold 31 and the injection core mold 32.

Since the gate region $S_1$ of the injection cavity mold 31 has a tapered shape in which a diameter increases toward the injection core mold 32, the flow velocity of the resin flowing through the gate region $S_1$ decreases toward an outlet of the gate region $S_1$, and the flow resistance of the resin also decreases.

Further, since the corner portion 34 is rounded at the exit of the gate region $S_1$, a vortex is less likely to occur in the flow of the resin at the corner portion 34. Therefore, the flow of the resin at the outlet of the gate region $S_1$ tends to be laminar flow flowing into a region of the bottom portion along a curved surface, and an increase in the flow resistance due to the vortex is also suppressed.

Furthermore, the interval $th_1$, of the mold space corresponding to the thickness of the bottom portion 12 is a value of 0.7 to 0.85 relative to the interval $th_2$, of the mold space corresponding to the thickness of the body portion 13, and the interval of the bottom portion is wider as compared with a mold of the related art in which a thickness of a bottom portion is about a half of a thickness of a body portion. Therefore, the resin easily flows toward the body portion in the region of the bottom portion of the mold space S as compared with the related art, and the flow resistance of the resin also decreases.

Then, the injection molds of the injection molding unit 21 are opened after completion of injection (filling and pressure holding) of the resin material or after a lapse of the minimum cooling time provided after the completion of injection.

From the viewpoint of manufacturing the container by a high-speed molding cycle, it is preferable to perform mold opening without providing the cooling time of the preform 10 in the injection mold after the completion of injection (filling and pressure holding) of the resin material in Step S101. In the above-described case, the preform 10 is prevented from being cooled in a state where there is no pressure holding in the injection mold, and thus, it is possible to suppress an event in which the preform 10 contracts during the cooling time to cause a sink mark.

On the other hand, in a case where the minimum cooling of the preform 10 is performed in the injection mold, the time (cooling time) for cooling the resin material after completion of injection of the resin material by the injection molding unit 21 is preferably a half or less of the time (injection time) for injecting the resin material. Further, the cooling time can be made shorter than the time for injecting the resin material depending on the weight of the resin material. For example, the cooling time is more preferably ⅖ or less, still more preferably ¼ or less, and particularly preferably ⅕ or less with respect to the injection time of the resin material.

When the injection molds are opened in Step S101, the preform 10 is released from the injection cavity mold 31 and the injection core mold 32 in a high temperature state in which an outer shape can be maintained. Next, the transfer plate of the conveyance mechanism 26 moves so as to rotate by a predetermined angle, and the preform 10 in the high temperature state held by the neck mold 27 is conveyed to the temperature adjustment unit 22.

Figure 7:
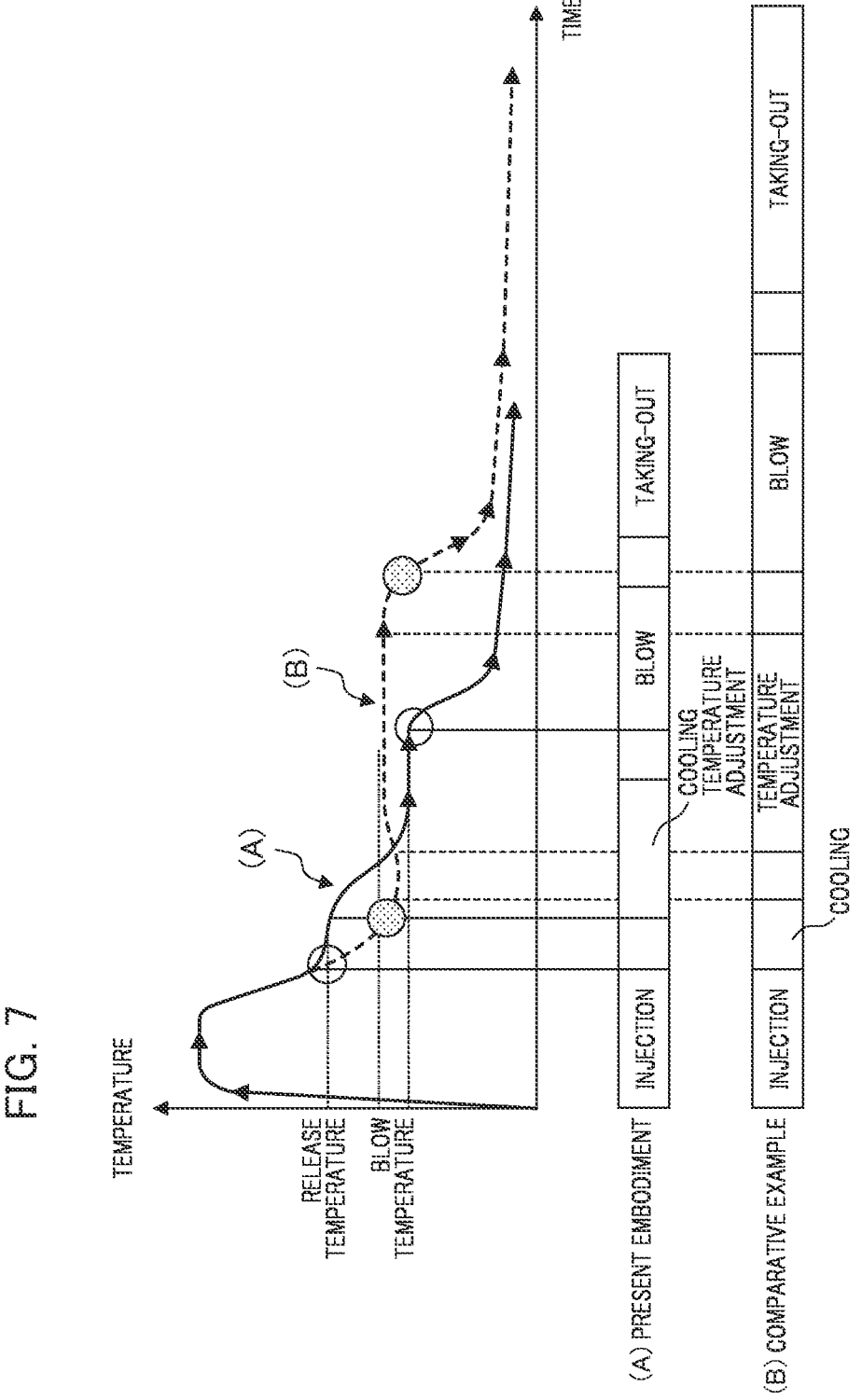
FIG. 7 is a graph illustrating examples of temperature changes of the preform in blow molding methods of the present embodiment and the comparative example.

Further, a temperature change of the preform 10 in the blow molding method of the present embodiment will be described with reference to FIG. 7. In FIG. 7, the vertical axis represents the temperature of the preform 10, and the horizontal axis represents time. In FIG. 7, an example of the temperature change of the preform 10 of the present embodiment is illustrated in (A) of FIG. 7.

Further, an example of a temperature change of a preform of a comparative example, which will be described later, is illustrated in (B) of FIG. 7. Note that the blank between the respective steps is the time required for transferring the preform 10 or the container, and has the same length.

In the comparative example (conventional method), as illustrated in (B) of FIG. 7, the preform is cooled to a temperature lower than or substantially equal to a blow temperature in a mold of an injection molding unit.

On the other hand, in the present embodiment, there is no cooling time for the preform 10 in the injection mold (or the cooling time is extremely short) as described above, and thus, a skin layer (surface layer in a solidified state) of the preform is thinner than that in the related art, and a core layer (inner layer in a softened or molten state) is formed thicker than that in the related art. That is, the preform 10 having a larger thermal gradient between the skin layer and the core layer and having a higher temperature and higher residual heat is molded as compared with the comparative example.

The preform 10 of the present embodiment is released from the injection molding unit 21 at a release temperature higher than that in the comparative example, and is conveyed to the temperature adjustment unit 22. With the movement to the temperature adjustment unit 22, the temperature of the preform 10 is equalized by heat exchange (heat conduction) between the skin layer and the core layer. Further, the preform 10 is slightly cooled from the outer surface by the contact with outside air. However, the temperature of the preform 10 of the present embodiment is maintained in an extremely high state as compared with that in the comparative example until the preform is carried into the temperature adjustment unit 22.

(Step S102: Temperature Adjustment Step)

Subsequently, cooling and temperature adjustment for bringing the temperature of the preform 10 close to a temperature (blow temperature) suitable for final blow are performed in the temperature adjustment unit 22. The blow temperature is set to, for example, 90° C. to 105° C. for a PET resin. Note that there is also a case where a low blow temperature makes the stretching orientation of the preform 10 favorable so that the strength (physical properties) of a container can be improved. Therefore, for example, the blow temperature may be set to 90° C. to 95° C. for the PET resin.

As illustrated in FIG. 7, in the temperature adjustment unit 22, the temperature of the preform 10 is lowered to the blow temperature, and then, the temperature of the preform 10 is maintained at the blow temperature until blow molding is performed. Since the preform in a high temperature state is rapidly cooled in the temperature adjustment unit 22, whitening (cloudiness) due to spherulite formation crystallization that may occur in the case of slow cooling is suppressed.

In a temperature adjustment step, first, the preform 10 is accommodated in the cavity mold 41 as illustrated in FIG. 5. Subsequently, the air introduction member 42 is inserted into the neck portion of the preform 10 accommodated in the cavity mold 41. At this time, the neck portion 11 of the preform 10 and the fitting core 44 are brought into close contact with each other to maintain airtightness therebetween.

Thereafter, cooling blow of the preform 10 is performed. In the cooling blow of the preform 10 of the present embodiment, compressed air is introduced from the air introduction rod 43 to the bottom portion side of the preform 10, and the compressed air is exhausted from the neck portion side of the preform 10.

Since the compressed air is ejected from the opening 43a of the air introduction rod 43 in the cooling blow, the low-temperature compressed air comes into contact with the bottom portion 12 of the preform 10 facing the opening 43a of the air introduction rod 43. The preform 10 is cooled from the inner side by the compressed air flowing inside, but the temperature of the compressed air gradually increases toward the body portion 13 and the neck portion 11 by heat exchange with the preform 10. Therefore, the bottom portion 12 of the preform 10 is cooled more locally and strongly as compared with the neck portion 11 and the body portion 13 of the preform 10 in the cooling blow.

Since the bottom portion 12 of the preform 10 is rapidly cooled by the above-described cooling blow, whitening in the central region of the bottom portion of the preform 10 is effectively suppressed.

Further, the residual heat of the bottom portion 12 increases in the preform 10 of the present embodiment since the thickness of the bottom portion 12 is relatively thick as compared with the preform of the related art in which the thickness of the bottom portion is about a half of the thickness of the body portion. However, the residual heat of the bottom portion 12 decreases as the bottom portion 12 is locally cooled by the temperature adjustment unit 22 as described above, and thus, excessive stretching of the bottom portion 12 (for example, breakage of the bottom portion 12) at the time of blow molding of the container is suppressed.

Further, the preform 10 in the temperature adjustment unit 22 continues to come into contact with the cavity mold 41 maintained at a predetermined temperature by receiving the pressure of the compressed air from the inner side. Therefore, in the temperature adjustment step, the temperature of the preform 10 is adjusted so as not to be equal to or lower than the temperature suitable for blow molding from the outer side, and the temperature unevenness generated from injection molding is also reduced. Note that the shape of the preform 10 is maintained by the cavity mold 41 and does not greatly change in the temperature adjustment step.

After the temperature adjustment step, the transfer plate of the conveyance mechanism 26 moves so as to rotate by a predetermined angle, and the preform 10 after the temperature adjustment held in the neck mold 27 is conveyed to the blow molding unit 23.

(Step S103: Blow Molding Step)

Subsequently, blow molding of the container 1 is performed in the blow molding unit 23.

First, the blow cavity mold is closed to accommodate the preform 10 in the mold space, and the air introduction member (blow core) is lowered, so that the air introduction member abuts on the neck portion of the preform 10. Then, the stretching rod (vertical-axis stretching member) is lowered to hold the bottom portion of the preform 10 from an inner surface, and blow air is supplied from the air introduction member to stretch the preform 10 along a horizontal axis while performing vertical-axis stretching as necessary. As a result, the preform 10 is bulged and shaped so as to be in close contact with the mold space of the blow cavity mold, and is blow-molded into the container 1. Note that the bottom mold stands by at a lower position not in contact with the bottom portion of the preform 10 before closing the blow cavity mold, and quickly rises to a molding position before the mold closing after the mold closing.

(Step S104: Container Taking-Out Step)

When the blow molding is finished, the blow cavity mold and the bottom mold are opened. As a result, the container 1 is movable from the blow molding unit 23.

Subsequently, the transfer plate of the conveyance mechanism 26 moves so as to rotate by a predetermined angle, and the container 1 is transported to the taking-out unit 24. In the taking-out unit 24, the neck portion of the container 1 is opened from the neck mold 27, and the container 1 is taken out to the outside of the blow molding apparatus 20.

Thus, a series of steps of the blow molding method is completed. Thereafter, the respective steps of S101 to S104 described above are repeated by moving the transfer plate of the conveyance mechanism 26 so as to rotate by a predetermined angle. During the operation of the blow molding apparatus 20, four sets of the containers 1 each having a time difference of one step are manufactured in parallel.

Note that the time for which the transfer plate is stopped in each of the injection molding unit 21, the temperature adjustment unit 22, the blow molding unit 23, and the taking-out unit 24 is the same due to the structure of the blow molding apparatus 20. Similarly, the conveyance time of the transfer plate between the respective units is the same.

Hereinafter, operational effects of the present embodiment will be described.

In the injection molding step (S101) of the present embodiment, the resin preform 10 having the body portion 13 and the bottom portion 12 is injection-molded, and the preform 10 is released in a high temperature state in which the outer shape of the preform can be maintained. In this injection molding step (S101), the injection mold in which the thickness of the bottom portion 12 is 0.7 to 0.85 relative to the thickness of the body portion 13 is used. In the injection mold of the present embodiment, the interval of the bottom portion 12 is wider than that in the mold of the related art, and the flow resistance of the resin at the bottom portion of the preform decreases. Therefore, shearing heat generation at the bottom portion of the preform is reduced during the injection molding, and excessive accumulation of heat in the central region of the bottom portion of the preform can be suppressed.

Further, in the temperature adjustment step (S102) of the present embodiment, the cooling blow for introducing the compressed air into the preform 10 to cool the bottom portion 12 of the preform 10 is performed. When the bottom portion of the preform is rapidly cooled together with the reduction in the shear heat generation at the bottom portion of the preform, the whitening of the central region of the bottom portion of the preform 10 is suppressed. As a result, it is possible to manufacture a container having high transparency and high quality even in a high-speed molding cycle in which the preform 10 is released at a high temperature.

Further, the gate region $S_1$ of the injection cavity mold 31 has a tapered shape in which a diameter increases toward the bottom portion, and the flow velocity and the flow resistance of the resin decrease toward the outlet of the gate region $S_1$. Therefore, the shear heat generation at the bottom portion of the preform can be further reduced even when the gate region $S_1$ has a tapered shape.

Further, since the corner portion 34 connecting the gate region $S_1$ and the outer surface of the bottom portion is rounded, the flow resistance due to the vortex is less likely to occur at the outlet of the gate region $S_1$. Therefore, the shearing heat generation at the bottom portion of the preform can be further reduced by rounding the corner portion 34 of the injection cavity mold 31.

The present invention is not limited to the above-described embodiment, and various improvements and design modifications may be made within the scope not departing from the gist of the present invention.

In the above-described embodiment, the device configuration of the hot parison and four station type has been described as an example of the blow molding apparatus. However, the blow molding apparatus of the present invention is not limited to the above-described embodiment, and may be applied to a blow molding apparatus other than the four station type as long as the injection molding unit, the temperature adjustment unit, and the blow molding unit are provided.

Further, the embodiment disclosed herein is to be considered as illustrative and not restrictive in all respects. The scope of the present invention is indicated not by the above description but by the claims, and it is intended that meanings equivalent to the claims and all modifications within the scope are included.

The invention claimed is:

1. A method for manufacturing a resin container, the method comprising:
   injection-molding a preform made of a resin and having a body portion and a bottom portion;
   adjusting a temperature of the preform manufactured in the injection molding; and
   blow-molding the preform having the adjusted temperature to manufacture a resin container,
   wherein the preform is bowl-shaped such that a diameter of a neck portion is set to be longer than a length from the top of the neck portion to the bottom portion,
   in the injection-molding, the preform is injection-molded using an injection mold in which a thickness of the bottom portion is 0.7 to 0.85 relative to a thickness of the body portion,
   in the adjusting the temperature, a coolant is introduced into the preform to cool the bottom portion of the preform, a vertical-axis stretching ratio of the preform in the blow-molding is from 3.0 to 7.0,
   the injection mold has a gate region into which a resin material is introduced from an outer side of the bottom portion,
   the gate region is formed in a tapered shape in which a diameter increases toward the bottom portion,
   a corner portion connecting the gate region and an outer surface of the bottom portion is rounded,
   the thickness of the bottom portion is 0.70 to 0.90 relative to the diameter dimension of the distal end side of the gate region, and
   a radius of the corner portion is 1.0 mm or more.

2. The method for manufacturing a resin container according to claim 1, wherein
   in the injection molding, the injection mold is opened after completion of filling and pressure holding of the resin material, and the preform is carried out without being cooled in the injection mold.

3. The method for manufacturing a resin container according to claim 1, wherein
   in the injection molding, the preform is released in a high temperature state in which an outer shape of the preform is maintainable.

4. The method for manufacturing a resin container according to claim 1, wherein
   in the injection molding, time for cooling the resin material in the injection mold after completion of injection of the resin material is a half or less of time for injecting the resin material into the injection mold.

5. An apparatus for manufacturing a resin container, the apparatus comprising:
   an injection molding unit configured to injection-mold a preform made of a resin and having a body portion and a bottom portion;
   a temperature adjustment unit configured to adjust a temperature of the preform manufactured by the injection molding unit; and
   a blow molding unit configured to blow-molds the preform having the adjusted temperature to manufacture a resin container,
   wherein the preform is bowl-shaped such that a diameter of a neck portion is set to be longer than a length from the top of the neck portion to the bottom portion,
   the injection molding unit injection-molds the preform using an injection mold in which a thickness of the bottom portion is 0.7 to 0.85 relative to a thickness of the body portion,
   the temperature adjustment unit introduces a coolant into the preform to cool the bottom portion of the preform,
   a vertical-axis stretching ratio of the preform in the blow-molding is from 3.0 to 7.0,
   the injection mold has a gate region into which a resin material is introduced from an outer side of the bottom portion,
   the gate region is formed in a tapered shape in which a diameter increases toward the bottom portion,
   a corner portion connecting the gate region and an outer surface of the bottom portion is rounded,
   the thickness of the bottom portion is 0.70 to 0.90 relative to the diameter dimension of the distal end side of the gate region, and
   a radius of the corner portion is 1.0 mm or more.

* * * * *